(12) United States Patent
Keane et al.

(10) Patent No.: US 12,072,901 B2
(45) Date of Patent: Aug. 27, 2024

(54) CUSTOMIZABLE DATE DIMENSION FOR NON-STANDARD CALENDAR

(71) Applicant: BUSINESS OBJECTS SOFTWARE LTD., Dublin (IE)

(72) Inventors: Mairtin Keane, Dublin (IE); Vlad Zat, Dublin (IE); Shane Conroy, Dublin (IE); Michael Zakharenkov, Dublin (IE); Cathal McGovern, Dublin (IE); Raffaele Sangiovanni, Dublin (IE); Michael Golden, Dublin (IE); Esther Rodrigo Ortiz, Dublin (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 0 days.

(21) Appl. No.: 18/074,704

(22) Filed: Dec. 5, 2022

(65) Prior Publication Data

US 2024/0184794 A1 Jun. 6, 2024

(51) Int. Cl.
*G06F 16/24* (2019.01)
*G06F 16/2458* (2019.01)
*G06F 16/248* (2019.01)

(52) U.S. Cl.
CPC ........ *G06F 16/2477* (2019.01); *G06F 16/248* (2019.01)

(58) Field of Classification Search
CPC ............................ G06F 16/2477; G06F 16/248
See application file for complete search history.

(56) References Cited

U.S. PATENT DOCUMENTS

| | | | | |
|---|---|---|---|---|
| 11,789,977 | B1* | 10/2023 | Mehta | G06F 16/2477 707/769 |
| 2010/0318545 | A1* | 12/2010 | Handy | G06F 16/2455 707/759 |
| 2012/0330996 | A1* | 12/2012 | Chang | G06F 16/2477 707/769 |
| 2013/0103658 | A1* | 4/2013 | Travis | G06F 16/2477 707/700 |
| 2020/0363910 | A1* | 11/2020 | Engrav | G06F 16/26 |

* cited by examiner

*Primary Examiner* — Kris E Mackes
*Assistant Examiner* — Cao D Vuong
(74) *Attorney, Agent, or Firm* — Buckley, Maschoff & Talwalkar LLC

(57) ABSTRACT

Systems and methods include reception of an object instance representing a date dimension member and comprising a key value, a user interface representation of the date dimension member, key values of ancestor date dimension members, and user interface representations of the one or more ancestor date dimension members, display of the user interface representation and the user interface representations of the ancestor date dimension members, reception of a request to cast the date dimension member to a higher granularity, and, in response to the request, generation of a second object instance representing a second date dimension member comprising key values of a second one or more of the ancestor date dimension members and user interface representations of the second one or more of the ancestor date dimension members, and display of the user interface representations of the second one or more of the ancestor date dimension members.

14 Claims, 15 Drawing Sheets

```
500
keys:   {
            half-year:  ' ',
            quarter:    ' ',
            month:      ' ',   } 510
            week:       ' ',
            day:        ' ',
            year:       ' '
        },
descriptions: {
            half-year:  ' ',
            quarter:    ' ',
            month:      ' ',   } 520
            week:       ' ',
            day:        ' ',
            year:       ' '
        },
```

*FIG. 5*

```
600
keys:   {
            half-year:  'H1',
            quarter:    'Q1',
            month:      ' ',
            week:       ' ',
            day:        ' ',
            year:       '2022'
        },
        descriptions: {
            half-year:  'First Half of Year',
            quarter:    'First Quarter',
            month:      ' ',
            week:       ' ',
            day:        ' ',
            year:       '2022'
        },
```

*FIG. 6*

```
1000
keys:   {
            half-year:  '',
            quarter:    '',
            month:      ' ',
            week:       ' ',
            day:        ' ',
            year:       '2022'
        },
        descriptions: {
            half-year:  '',
            quarter:    '',
            month:      ' ',
            week:       ' ',
            day:        ' ',
            year:       '2022'
        },
```

*FIG. 10*

```
1100 keys:   {
            half-year:  'H1',
            quarter:    'Q1',
            month:      '01',
            week:       '01',
            day:        ' ',
            year:       '2022'
        },
descriptions: {
            half-year:  'First Half of Year',
            quarter:    'First Quarter',
            month:      'January',
            week:       'Week 01',
            day:        ' ',
            year:       '2022'
        },
```

*FIG. 11*

CUSTOMIZABLE DATE DIMENSION FOR NON-STANDARD CALENDAR

BACKGROUND

Modern computing systems generate and store vast amounts of data. This data is often stored in a structured format, such as in database tables conforming to a particular data schema. A user device may execute an application to query the database tables and view results of the query in a tabular format.

The queries are commonly restricted to a particular range of dates. Both client and backend applications typically assume the use of the standard Gregorian calendar, which facilitates the communication of dates therebetween. Specifically, a client application may use commonly-available date libraries to operate on and display dates without communicating to a backend application since the identifiers for all date dimension members are in a fixed predefined format known to the client application.

Conventionally, the only calendar customization provided by such applications is a fiscal shift, which refers to specifying which month is to be considered as the beginning of the year. This lack of customizability limits the adoption of such applications, since it is not possible to define and utilize a non-standard calendar which may differ drastically from the standard Gregorian calendar. For example, it may be desirable to define a non-Gregorian time period (i.e., a range of days which cannot be defined using standard weeks, months, quarters, etc.) as a holiday season period. Moreover, as is commonly-desired in financial planning and reporting, it may be helpful to include a thirteenth period in a year for adjustment postings, as opposed to the maximum twelve periods that exist in the standard Gregorian calendar.

System for design and consumption of custom date dimensions are desired.

BRIEF DESCRIPTION OF THE DRAWINGS

FIG. 3 is a view of a user interface for modelling a custom hierarchical date dimension according to some embodiments.

FIG. 4 is a view of a user interface for modelling a custom hierarchical date dimension according to some embodiments.

FIG. 5 depicts a canonical date object according to some embodiments.

FIG. 6 depicts a canonical date object instance according to some embodiments.

FIG. 10 depicts a canonical date object instance cast from a lower-level canonical date object instance according to some embodiments.

FIG. 11 depicts a canonical date object instance cast from a higher-level according to some embodiments.

DETAILED DESCRIPTION

The following description is provided to enable any person in the art to make and use the described embodiments. Various modifications, however, will remain readily-apparent to those in the art.

According to some embodiments, the structure and format of the date dimension may be customized to differ from the standard Gregorian calendar. In one example, data may be stored on specific weeks which aggregate to specific months and quarters. Such aggregations are not possible in the standard Gregorian calendar since some weeks belong to two different months or quarters. In another example, each year includes only three quarters and seven months. Embodiments may also support a 53rd week or special periods for adjustments. Moreover, the identifiers used for dimension members (e.g., specific months) might be different from traditional Gregorian names (e.g., January, February), and their user interface representations (i.e., descriptions) may also differ.

Due to such customization, a client application cannot assume any particular structure of the date dimension or the format of the dimension members. The client application is therefore not able to independently generate or interpret these unique identifiers of date dimension members (e.g., a specific month, quarter or week) for communication with the backend application. Additionally, the client application (e.g., running in a browser) cannot leverage existing date libraries to manipulate dates (e.g., to cast a date to a different granularity, to increment/decrement a date by a particular amount).

Embodiments provide an efficient mechanism to construct unique identifiers for date dimension members of a customized date dimension. Embodiments further provide systems to increment or decrement dates and to cast dates without requiring advance knowledge of the hierarchical structure of the customized date dimension.

Figure 1:
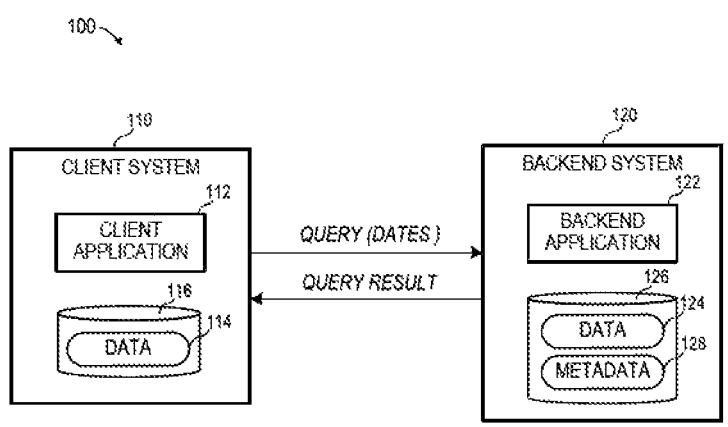
FIG. 1 is a block diagram of a system architecture implementing custom date dimensions according to some embodiments.

FIG. 1 is a block diagram of system architecture 100 according to some embodiments. Each illustrated component of system architecture 100 and of all systems described herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more components of system architecture 100 are implemented by a single computing device, and/or two or more components of system architecture 100 are co-located. One or more components of system architecture 100 may be implemented using cloud-based resources, and/or other systems which apportion computing resources elastically according to demand, need, price, and/or any other metric.

Client system 110 may comprise a computing device such as, but not limited to, a desktop computer, a laptop computer, a smartphone and a tablet computer. Client system 110 may store and execute program code of software applications such as client application 112. Client data 114 may include data (e.g., document files, spreadsheet files) used by such applications to provide functionality to a user operating client system 110. Client data 114 is stored on persistent storage device 116 (e.g., a hard drive), which may also store program code of applications, operating system files, device drivers, etc.

Client application 112 operates to retrieve data stored at a remote system for presentation on a display device (not shown) of client system 110. Client application 112 may comprise a standalone application which issues calls (e.g., APIs, Web service calls) to a remote system to acquire specified data and to request operations on the data. Client application 112 may comprise a Web application designed for execution within a Web browser executing on client system 110. Such a Web application may be built upon a framework of code libraries as will be described below.

Backend system 120 executes backend application 122 to receive requests from client application 112 and provide responses thereto based on data 124 stored in storage system 126. Data 124 may comprise database tables conforming to a data schema defined by metadata 128 as is known in the art. Metadata 128 defines columns of such database tables and properties thereof, as well as relationships (e.g., foreign key relationships) between the database tables. Metadata 128 may also define dimensions (Product, Country, etc.) and dimension members (Shirts, Canada, etc.) which may correspond to database columns.

Dimensions may be hierarchical, in which certain dimension members are associated with different hierarchical levels. For example, a Geography dimension may include Country dimension members on a first level and City dimension member on a lower level, where every City dimension member is a child of only one Country dimension member. Each dimension may be associated with properties as is known in the art.

According to some embodiments, metadata 128 defines a Date dimension as a hierarchy of dimension members as described above. Unlike the prior art, the hierarchy might not conform to the hierarchy of a standard Gregorian calendar. As will be described below; the Date dimension may be defined by an administrator of backend system 120 and various mechanisms may be employed to allow client application 112 to efficiently handle dates conforming to such a customized Date dimension.

In some embodiments, backend system 120 is a database system and backend application 122 is a query server or other data service provider. Backend system 120 and backend application 122 may be configured to receive and respond to queries received in parallel from many users operating many disparate client systems.

Backend system 120 may comprise one or more computer servers located proximate to or remote from one another. Accordingly, backend application 122 and backend data 124 may be implemented in a single-node or distributed manner. In some embodiments, backend application 122 is implemented using geographically-distributed and redundant cloud compute nodes and backend data 124 is implemented using geographically-distributed and redundant cloud storage nodes.

As illustrated in FIG. 1, a user may operate client system 110 to cause client application 112 to transmit a query to backend system 120. The query may comprise a request which specifies data of data 124 associated with a specific time period (i.e., specific dates) and conforms to any suitable protocol. Assuming suitable authentication and authorization of the user, backend application 122 generates a query result based on data 124 in response to the query as is known in the art. Backend application 122 then returns the query result to client application 112. The query result may comprise rows of data (i.e., column values) of a database table and corresponding column labels, or names.

The transmitted query may specify one or more dates in addition to one or more filter values. The dates may comprise a date period over which data is desired (e.g., Sales in North America for 2020). According to some embodiments, the dates are expressed in object notation as will be described below. Generally, each data may be represented as an instance of a date object, described herein as a canonical date object. A canonical date object provides a general format by which a date dimension member of a custom hierarchical date dimension may be represented.

Figure 2:
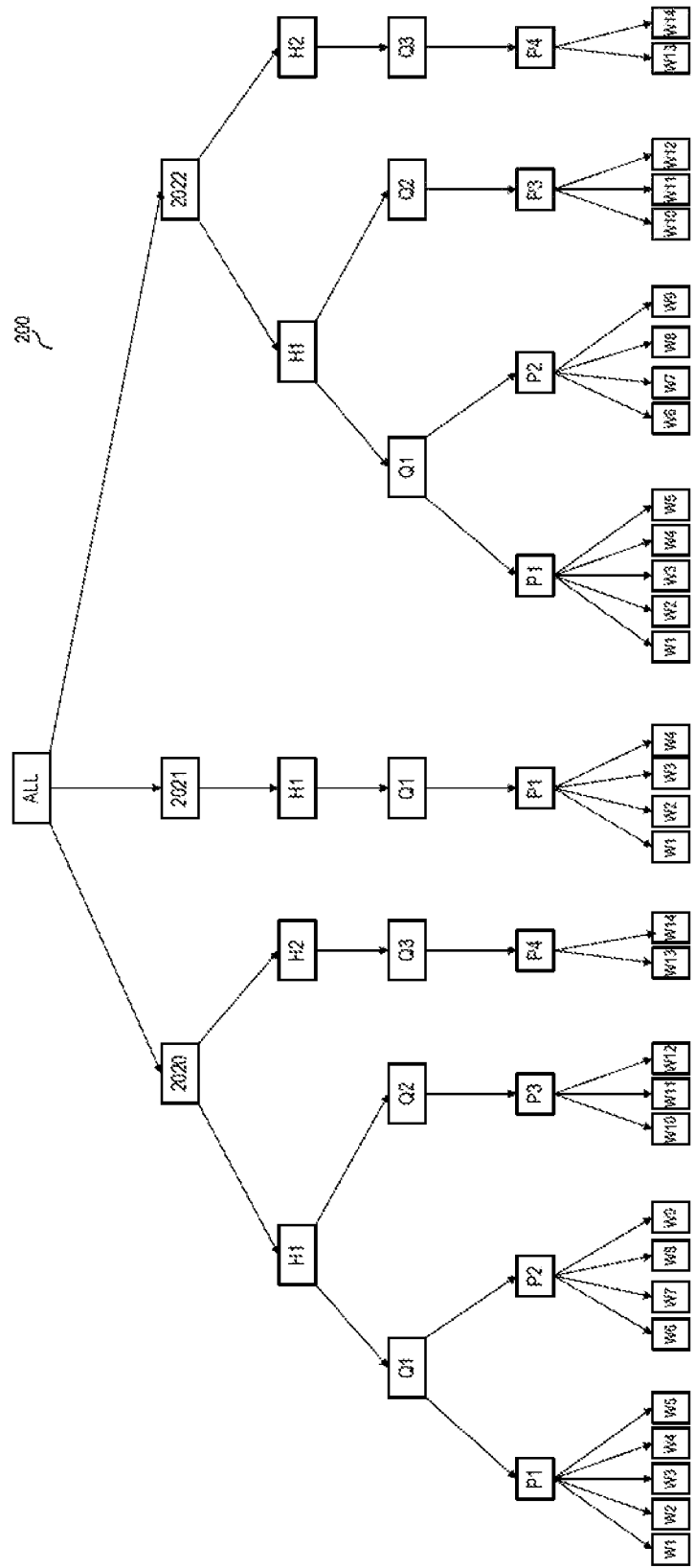
FIG. 2 depicts dimension members of a custom hierarchical date dimension according to some embodiments.

FIG. 2 depicts dimension members of custom hierarchical date dimension 200 according to some embodiments. As will be described below, hierarchical date dimension 200 may be defined by an administrator or developer of a backend application based on needs of an enterprise. Each member of dimension 200 is depicted using its internal identifier. As will be described below, each member may be associated with a description which is used to represent the member on a user interface of a client application.

As shown, Year member 2020 includes two Half-Year members H1 and H2. Half-Year member H1 of Year member 2020 includes Quarter members Q1 and Q2, but Half-Year member H2 of Year member 2020 includes only one Quarter member, Q3. Quarter member Q1 of Year member 2020 includes Period members P1 and P2, while Quarter members Q2 and Q3 of Year member 2020 include Period members P3 and P4, respectively. Each Period member of Year member 2020 includes a different number of Week members. The Week members are at the lowest level of dimension 200.

In contrast to Year member 2020, Year member 2021 includes one Half-Year member H1, and Half-Year member H1 of Year member 2021 includes one Quarter member Q1. Quarter member Q1 of Year member 2021 includes Period member P1 which in turn includes four Week members. Year member 2022 shares a same structure as Year member 2020.

Figure 3:
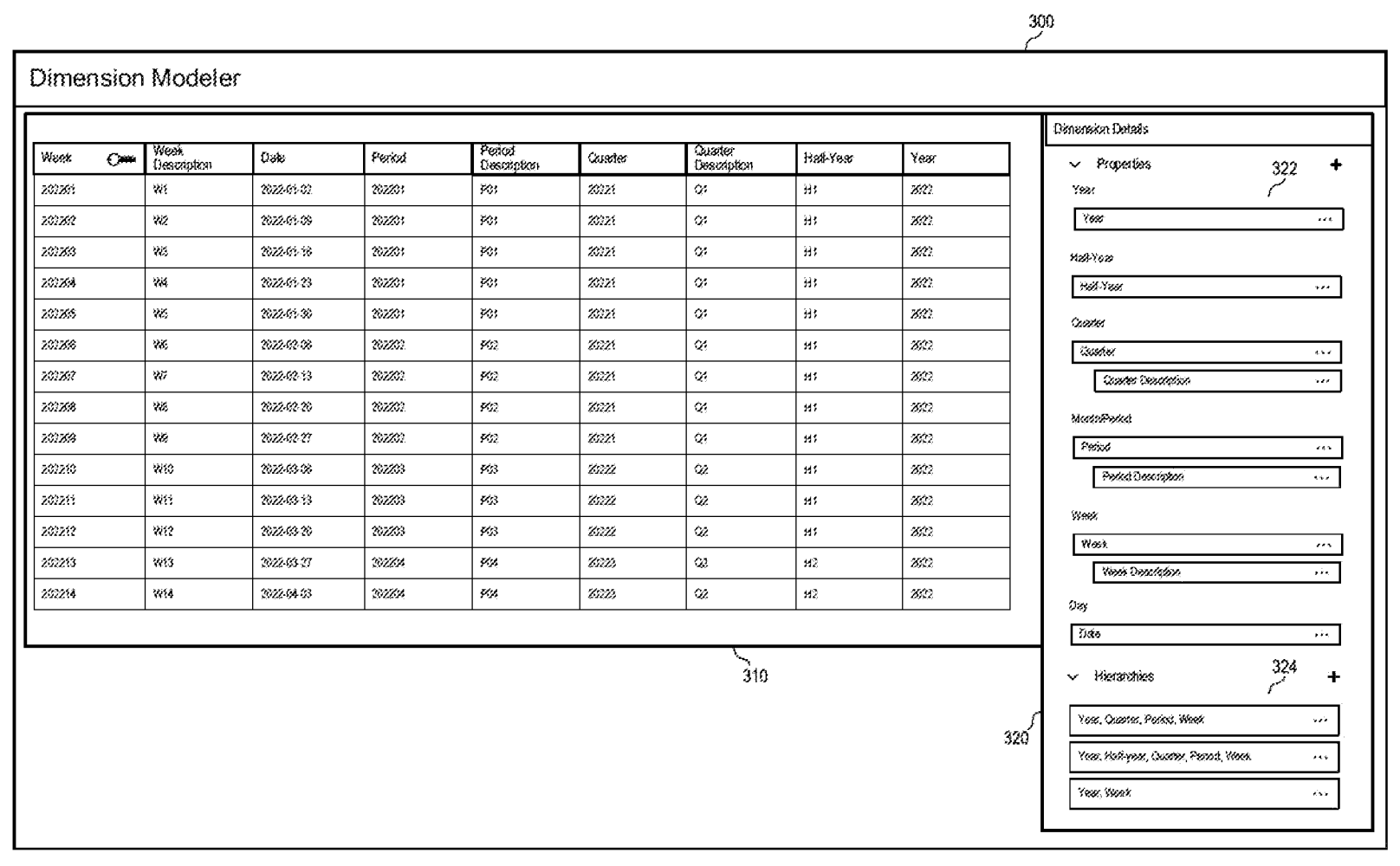

FIG. 3 is a view of user interface 300 according to some embodiments. Backend application 122 may provide user interface 300 to an administrator to allow definition (i.e., modelling) of a customized date dimension according to some embodiments. Metadata defining the customized date dimension may be stored in metadata 128 of backend system 120.

User interface 300 of FIG. 3 illustrates dimension members of Year member 2022. Each row of table 310 represents one dimension member, represented by a unique value of a key column. In the present example, the column Week has been designated as the key column. The Week dimension is the lowest level in the hierarchy and the value of the Week key column must be unique for each member of the Week dimension.

Area 320 of interface 300 allows definition of dimension details. A dimension member may be defined to include any number of properties displayed in Properties area 322 and represented by respective columns of table 310. The example of FIG. 3 includes nine properties.

The Date property is mandatory and allows synchronization of dates with a client application as will be described below. Accordingly, the value of the Date property must be unique for each dimension member.

Figure 4:
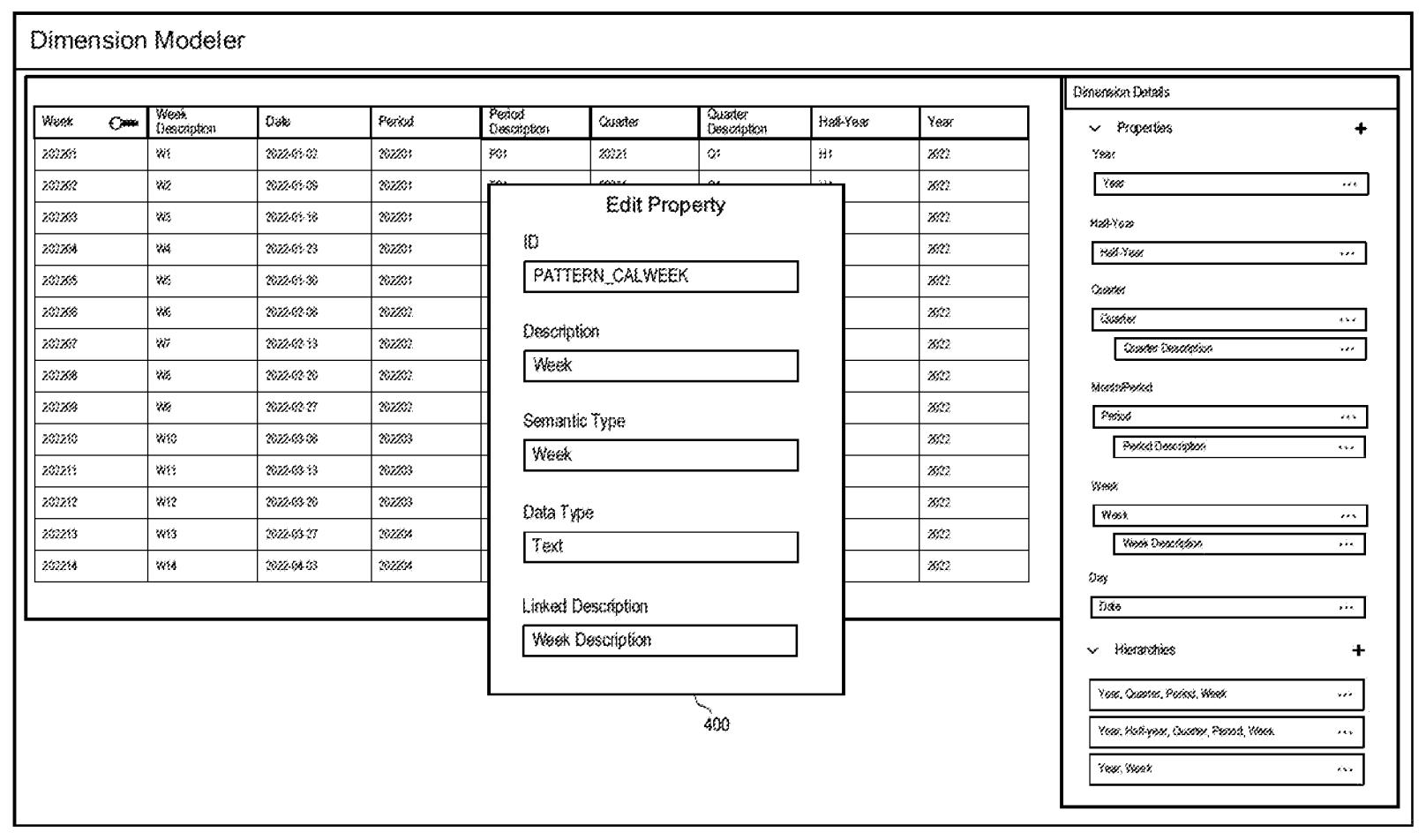

Each other property may be defined by, for example, selecting the ellipses (i.e., " . . . ") adjacent to the name of the property in area 320. Such a selection may result in display of a property dialog such as dialog 400 of FIG. 4. Dialog 400 includes input fields ID, Description, Semantic Type, Data Type, and Linked Description. The ID field includes an internal identifier for the property. The ID may be any desired text and must be unique amongst all dimension members.

The Description field includes the user interface representation (i.e., the text name) of the property as displayed in the backend application (i.e., the title of the corresponding column of table 310). The Semantic Type field is used to assign one of a set of available semantic types to the property. Available semantic types may include Year, Half-Year, Quarter, Period, Month, Week, Day, but embodiments are not limited thereto.

The Data Type field is used to assign a data type (e.g., Text, Decimal, Integer, Date) to the property, and the Linked Description field is used to indicate a separate property which contains the description of this property. This linked description is a value that will be displayed in a client application. For example, dialog 400 links the Week Description property to the Week property. Accordingly, rather than displaying the value "202201" to indicate the corresponding Week dimension member to a user of the client application, the corresponding value "W1" of the Week Description property is displayed. If no property is specified in the Linked Description field (as in the case of the Year and Half-Year properties shown in area 322), the actual identifier of the dimension member (e.g., "202201") is displayed. The values of the property specified in the Linked Description field may differ from dimension member values used in a standard calendar.

The administrator may therefore simply annotate properties of the dimension with an appropriate semantic type and link multiple properties together to create a hierarchy. Area 320 of user interface 300 shows that the Year property has been assigned the Year semantic type, the Half-Year property has been assigned the Half-Year semantic type, the Quarter property has been assigned the Quarter semantic type, the Period property has been assigned the Month/Period semantic type, the Week property has been assigned the Week semantic type, and the Date property has been assigned the Day semantic type. Hierarchies are defined from the semantic types using Hierarchies area 324 of area 320.

FIG. 5 depicts canonical date object 500 according to some embodiments. Object 500 specifies a format to describe a Date dimension member, including information regarding a position of the member in the dimension hierarchy. Instances of object 500 may be used to communicate dates based on a custom Date hierarchy between a client application and a backend application.

The values of Keys property 510 may be used in queries that are sent to a backend application. The backend application may use the key values to identify a corresponding dimension member. Description property 520 includes a representation displayed by a user interface of a client application for each corresponding dimension member indicated by the values of Keys property 510. As described above, it is not required for each Key value to be associated with a corresponding value of Descriptions property 520.

Object 500 allows storage of information associated with all ancestor dimension members. For example, for a dimension member which is at a granularity of Month, object 500 stores information for ancestor Year, Half-Year, and Quarter dimension members while the values of Week and Day remain empty. Storing this information facilitates operation on Date dimension members in a manner that reduces communication with the backend system as will be described below.

FIG. 6 depicts canonical date object instance 600 according to some embodiments. Object instance 600 represents a particular dimension member, specifically, the first quarter of the first half of year 2022. According to some embodiments, a client application may connect to a backend application and provide a current date thereto. The current date may be provided in a format known to both applications, such as YYYY-MM-DD.

The backend application may use this provided date to locate a closest Date dimension member using the values of Date property of interface 300. The values of the mandatory Date property therefore allow for mapping of the current Gregorian calendar date to a Date dimension member. The mapping is not necessarily a one-to-one mapping, but instead locates the current date within the Date dimension and determines the Date dimension member that is nearest to the current date. The nearest Date dimension member (including its ancestor members) may then be returned to the client application as an object instance such as instance 600.

Figure 7:
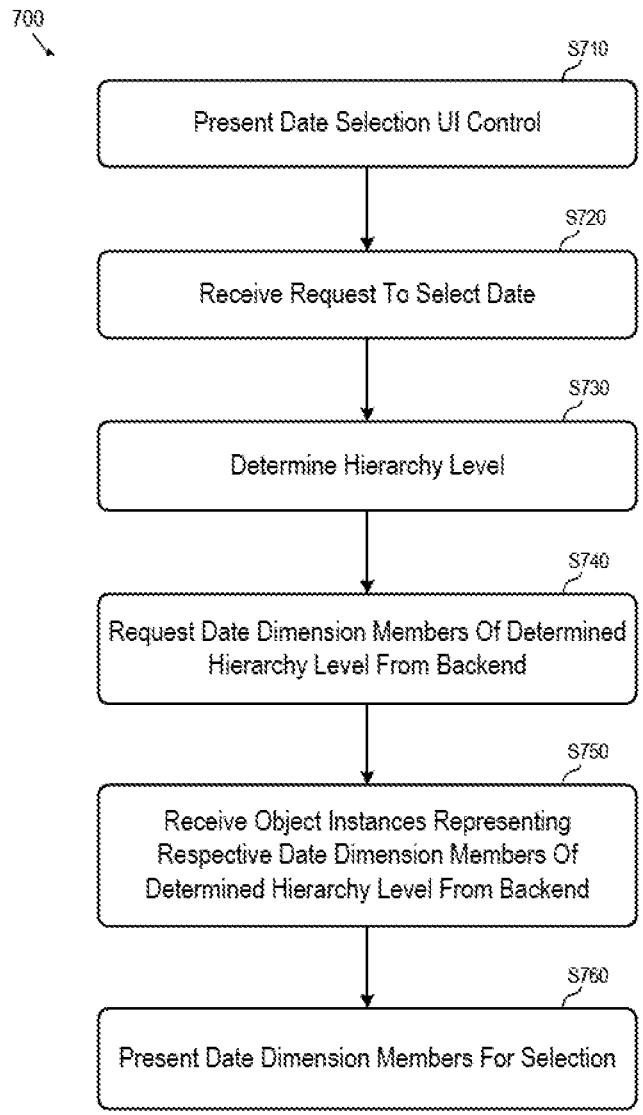
FIG. 7 is a flow diagram of a process to display dates of a custom hierarchical date dimension according to some embodiments.

FIG. 7 is a flow diagram of process 700 to display dates of a custom hierarchical date dimension according to some embodiments. Process 700 may be performed using any suitable combination of hardware and software. Software program code embodying this process may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S710, a date selection user interface control is presented. According to some embodiments, the client application is executed in a Web browser of a client device and a user interface of the client application is presented on the client device. The client application is assumed to be in communication with a backend application which implements a custom date dimension as described herein. The user interface includes a date selection user interface control for allowing a user of the client device to specify a date to be used, for example, within a query filter.

Figure 8A:
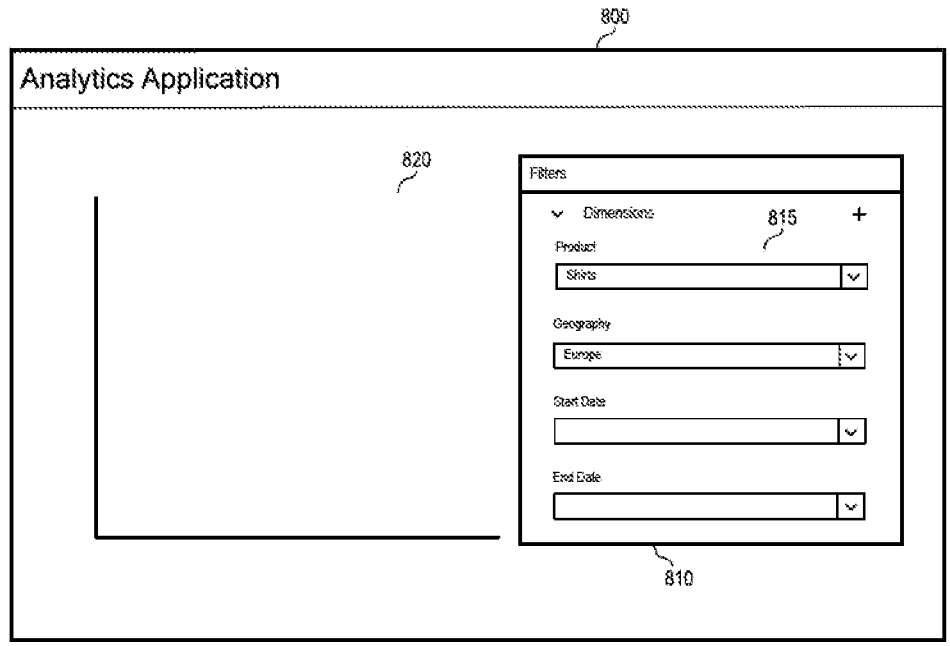
FIGS. 8A and 8B are views of a user interface to display dates of a custom hierarchical date dimension according to some embodiments.

FIG. 8A is a view of a user interface 800 of an analytics application. User interface 800 may be presented by any type of display device of any size that is or becomes known, in response to execution of processor-executable program code. The display device may be separate from or integral with a computing system which executes the program code. User interface 800 includes Filter interface 810 which allows a user to input dimension values for a query on a backend data source. In the illustrated example, visualization area 820 is intended to graphically depict a result set of the query.

At S720, a request is received to select a date. Interface 810 includes drop-down boxes 815 associated with dimensions which allow specification of one or more values of the dimensions. For example, the user may select a drop-down box associated with Start Date to specify a start date for the query.

Next, a hierarchy level, or granularity, is determined at S730. The hierarchy level is the level of dates which are allowed to be selected. In some examples, the backend system previously communicated the semantic types of the current Date dimension hierarchy, and the determined hierarchy level is selected therefrom by the user. According to some embodiments, the determined hierarchy level is simply the lowest available level. Taking dimension hierarchy 200 as an example, the hierarchy level may be determined as the level of the Week dimension members.

At S740, date dimension members of the determined hierarchy level are requested from the backend system. According to some embodiments, the client application transmits a request to the backend system for object instances representing all such dimension members. Object instances representing the respective date dimension members of the backend are received at S750. Continuing the above example, an object instance may be returned at S750 for each Week dimension member of each of years 2020, 2021 and 2022.

Figure 8B:
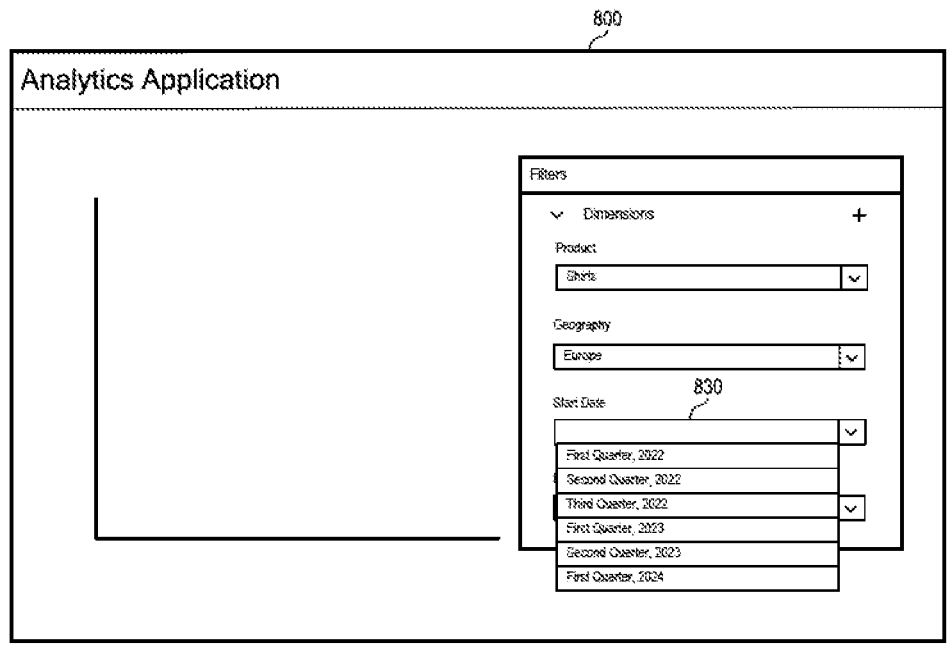

The date dimension members are displayed for selection at S760. FIG. 8B illustrates interface 800 displaying date dimension members 830 for selection. Each displayed date dimension member corresponds to one received object instance. It is noted that the Date dimension hierarchy corresponding to the displayed members includes dimension members of only the Year and Quarter semantic type. Each date dimension member is displayed to include the linked text descriptions of the dimension member and of its ancestor dimensions, as specified by the Descriptions property of its corresponding object instance.

Figure 9:
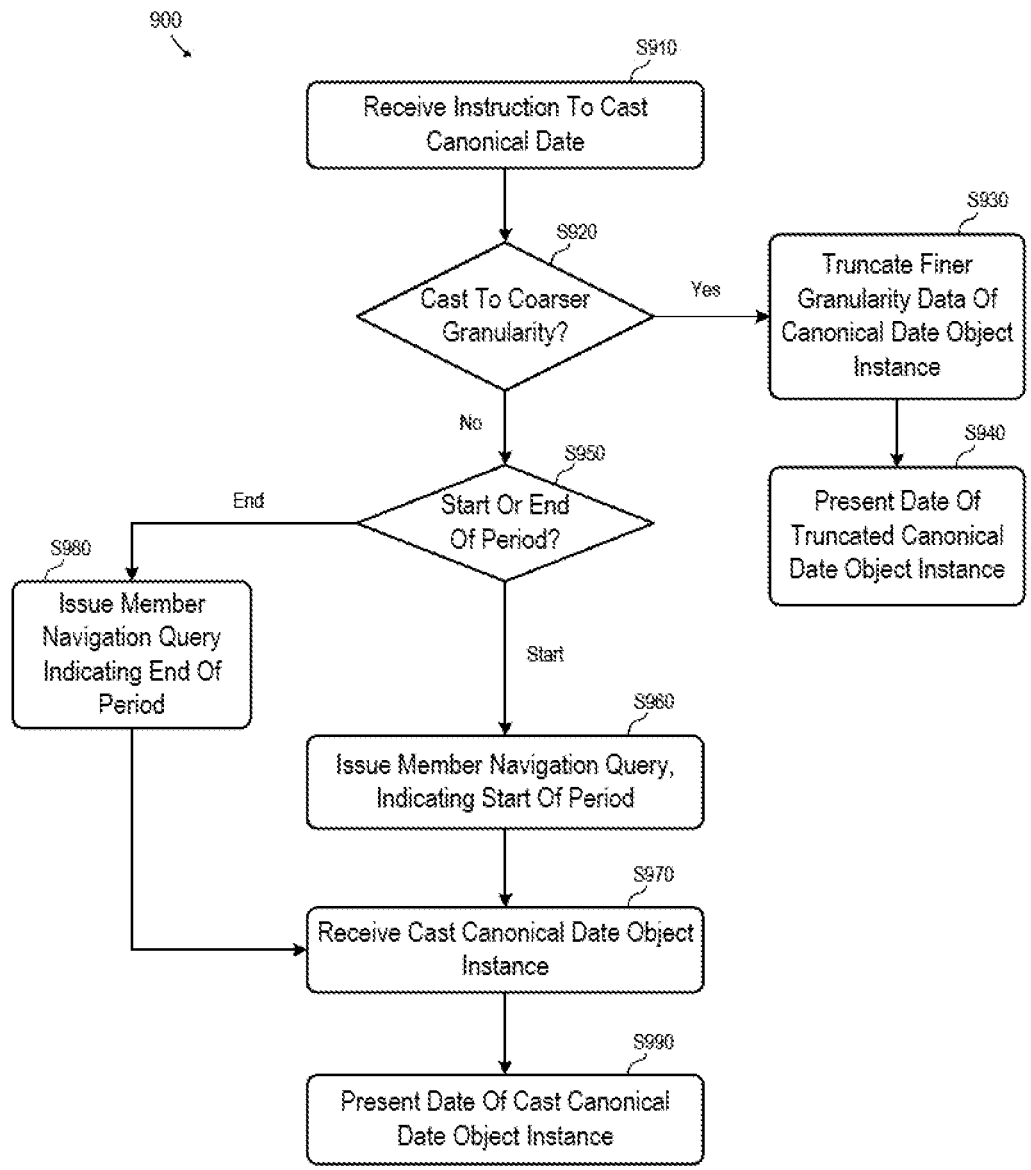
FIG. 9 is a flow diagram of a process to cast canonical dates of a custom hierarchical date dimension according to some embodiments.

FIG. 9 illustrates a process to cast a canonical date. Casting a date involves converting a given date to either a finer or coarser granularity.

At S910, an instruction is received to cast a canonical date. The canonical date may exist at a client system in object instance format as described above. For example, the client system may have provided a backend system with an identifier of a date in a format known to the backend system and the backend system returned an object instance corresponding to the date based on the identifier as described above. In the present example, it will be assumed that the canonical date to be cast is the date represented by object instance 600 of FIG. 6.

Initially, it will also be assumed that the instruction is an instruction to cast the canonical date to the Year dimension level. Since the Year dimension level is at a coarser granularity than the level of object instance 600 (i.e., Quarter), flow proceeds from S920 to S930. At S930, values of the object instance associated with granularities finer than the Year dimension level are truncated. Object instance 1000 of FIG. 10 represents the resulting cast canonical date in the present example, with the values of object instance 600 associated with the Half-Year and Quarter keys and descriptions properties having been truncated therefrom. The date represented by object instance 1000 may then be displayed at $940 (e.g., as '2022' per the value of the Year Description property).

It will now be assumed that the instruction received at S910 is to cast the canonical date of object instance 600 to the Week dimension level. Accordingly, flow proceeds from S920 to S950. Since the casting is to a finer granularity level, it is necessary to determine to what part (i.e., beginning, middle, end, etc.) of the finer level the date should be cast. For example, in the context of a normal Gregorian calendar, casting a date at the Year dimension level to the Month level would result in January if the beginning of the finer level was selected and in December if the end of the finer level were selected.

Accordingly, at S950, it is determined whether the date should be cast to the start or end of the finer granularity level. This determination may be based on a user-overridable default (e.g., start) or may require the user to specify either the start or the end. If the date is to be cast to the start of the finer granularity level, a query is issued to the backend at S960 indicating the start of the period.

The query may comprise a query to identify a member of a hierarchical dimension which is a descendant of the canonical date received at S910 and which is located at the start of the required granularity level. The backend system, in this regard, may support member navigation functionality to navigate members of a hierarchical dimension and return a located member in response to a suitable member navigation query. The query may comprise but is not limited to an Information Access (InA) query. The query model for analytic InA requests consists of a description of the designated result set which describes the data selection and calculations in a multidimensional manner.

An object instance of a canonical date object is received from the backend at S970. The instance represents a finer granularity date to which the original date was cast. Object instance 1100 of FIG. 11 represents an object instance received at S970, in a case where the date of object instance 600 is cast to a Week level granularity based on a custom Date dimension. The date is presented at S990. Based on object instance 1100, the date may be presented as "Week 01, January, First Quarter, First Half of Year, 2022".

Flow proceeds from S950 to S980 if it is determined at S950 to cast the date to the end of the finer granularity level. A query is issued at S980 as described above with respect to S960, albeit using a member navigation query indicating an end of the finer granularity level. An object instance is received in response at S970 and is presented (e.g., "Week 52, December, Fourth Quarter, Second Half of Year, 2022").

Figure 12:
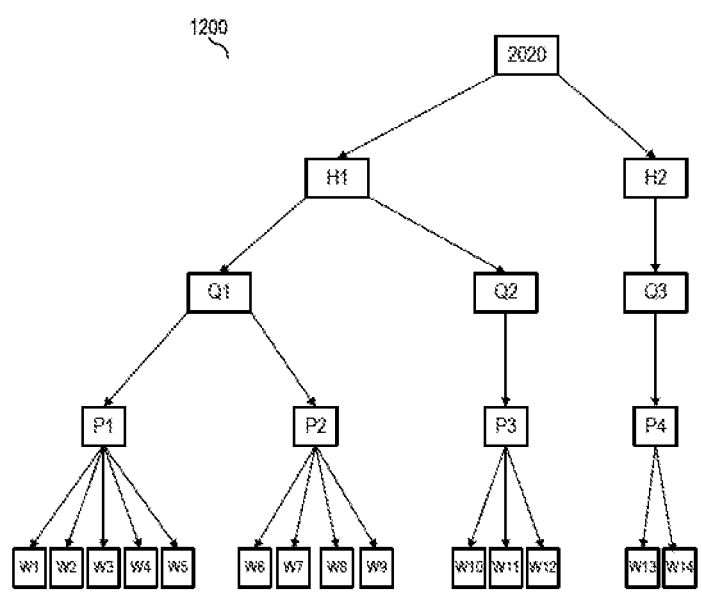
FIG. 12 depicts dimension members of a custom hierarchical date dimension according to some embodiments.

FIG. 12 illustrates date dimension 1200 according to some embodiments for purposes of describing member navigation according to some embodiments. Assuming a decrement operation which requests a dimension member two weeks prior from dimension member W10, a member navigation operation will look back at all members of the same level and return member W8. However, if the requested dimension member is fifty weeks prior from dimension member W10, member navigation would return the first dimension member of the level (i.e., member W1). Similarly, incrementing forward three 3 weeks from dimension member W10) results in dimension member W13 but incrementing forward ten weeks from dimension member W10 results in dimension member W14 (i.e., the last member).

A member navigation service will return an empty result if the dimension member requested by a query does not exist. For example, an empty result is returned if the query requests a month incremented by a number of months which is greater than the number of future months in the date dimension. To ensure that a date dimension member is returned, and to improve average performance, some embodiments include fallback operations along with a primary operation within the query sent from the client application. Depending on the increment type (i.e., standard or offset) the fallbacks may retrieve the first or last member of the dimension or reflect a more complex approach which checks each dimension level from the current member to the ancestor member based on which an offset is defined.

The fallback operations are sorted ascending based on the hierarchy index. Some of the fallback operations may return a dimension member and some may return an empty result set, or NULL. The results returned by a fallback operation are used by the client application only if all prior fallback operations in the ascending sort have returned an empty result set. In order to ensure that at least one operation returns a dimension member, the query also includes a last (i.e., lowest-sorted) operation which retrieves the first member of the dimension if looking back and the last member of the dimension if looking ahead.

Figure 13:
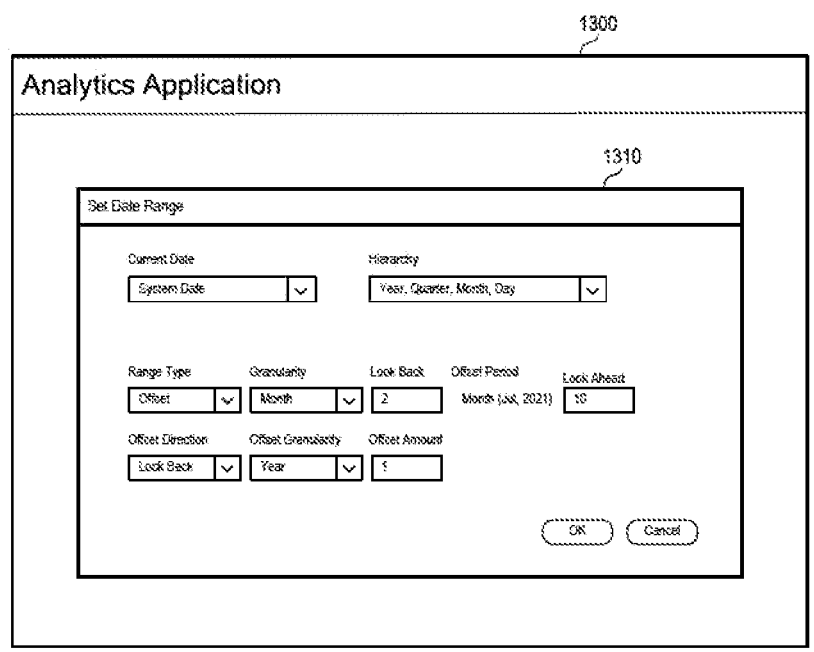
FIG. 13 is a view of a user interface to select a data range according to some embodiments.

FIG. 13 shows user interface 1300 of an analytics application including dialog 1310 for setting a date range including an offset (i.e., a Range Type of Offset) and increments. The date range is to begin two months from the current date (e.g., July 2022) and end ten months after the current date, but the current date is to be offset by one year in the past. Accordingly, the offset period is July 2021 and the range is May 2021 to May 2022.

The algorithm for determining such a range based on increments and an offset may proceed as follows. First, the offset period is determined by incrementing dimension members at the ancestor level. Next, the offset period is cast to the selected granularity (e.g., Month according to dialog 1310). Finally, incrementing from the cast date is performed by member navigation at the selected granularity level as described above.

Incrementing at the ancestor level requires additional fallback operations due to the possible existence of "gaps" in the date dimension. Such gaps exist in a case that dimension members at a same level have different numbers of child members, for example where one month includes more weeks than other months. In the example of dimension 200 of FIG. 2, Year 2021 includes no dimension members corresponding to Week members W5-W14, Period members P2, P3, Quarter members Q2, Q3 or Half-Year member H2 of Year 2020. In this regard, two dimension members are said to correspond to one another if they share the same index position at the same level in the hierarchy, albeit residing in a different branch of the hierarchy.

It will be assumed that a request is received (e.g., via dialog 1310) to offset dimension member 2020.H2.Q3.P4.W14 one year forward. Accordingly, a query is issued to the backend including a primary request and several fallback requests. Generally, the number of fallback requests within a query is equal to the level depth of the dimension member to be offset, or five in the present example. The query including the fallbacks are issued in one call to the backend to reduce overall latency. In some embodiments, only the initial query is issued to the backend and fallback requests are issued only as needed in response to empty result sets returned from the backend.

In the present example, the primary request requests 2021.H2.Q3.P4.W14. A first fallback request identifies the first ancestor (i.e., 2020.H2.Q3.P4) and attempts to retrieve a corresponding dimension member from the following year. A second fallback request identifies the next ancestor (i.e., 2020.H2.Q) and attempts to retrieve a corresponding dimension member from the following year. A third fallback request identifies the next ancestor (i.e., 2020.H2) and attempts to retrieve a corresponding dimension member from the following year. A fourth fallback request identifies the next ancestor (i.e., 2020) and attempts to retrieve a corresponding dimension member from the following year. A fifth fallback request identifies the last child of the last-retrieved ancestor.

Referring to dimension 200, the primary request and the first, second and third fallbacks would each return an empty result, since, in turn, 2021.H2.Q3.P4.W14 doesn't exist, 2021.H2.Q3.P4 doesn't exist, 2021.H2.Q3 doesn't exist, and 2021.H2 doesn't exist. Since 2021 exists, the fourth fallback would return 2021.H1.Q1.P1. W4. The fifth fallback would also return 2020.H2.Q3.P4.W14, but this result would be ignored in favor of the result of the fourth fallback due to the hierarchical arrangement of the fallback requests.

In another example, a request is received to offset dimension member 2022.H2.Q3.P4.W14 one year backward. In response, a query is issued to the backend including a primary request for 2021.H2.Q3.P4.W14 and five fallback requests. A first fallback request identifies the first ancestor (i.e., 2022.H2.Q3.P4) and attempts to retrieve a corresponding dimension member from the preceding year. A second fallback request identifies the next ancestor (i.e., 2022.H2.Q) and attempts to retrieve a corresponding dimension member from the following year. A third fallback request identifies the next ancestor (i.e., 2022.H2) and attempts to retrieve a corresponding dimension member from the following year. A fourth fallback request identifies the next ancestor (i.e., 2022) and attempts to retrieve a corresponding dimension member from the following year. A fifth fallback request retrieves the first child of the last-retrieved ancestor.

Again referring to dimension 200, the primary request and the first, second and third fallbacks of the latter example would each return an empty result, since corresponding dimension members 2021.H2.Q3.P4.W14, 2021.H2.Q3.P4, 2021. H2. Q3, and 2021.H2 do not exist. Since 2021 exists, the fourth fallback would return 2021.H1.Q1.P1. W1. The fifth fallback would also return 2022.H1.Q1.P1.W1, but this result would be ignored in favor of the result of the fourth fallback due to the hierarchical arrangement of the fallback requests.

Figure 14:
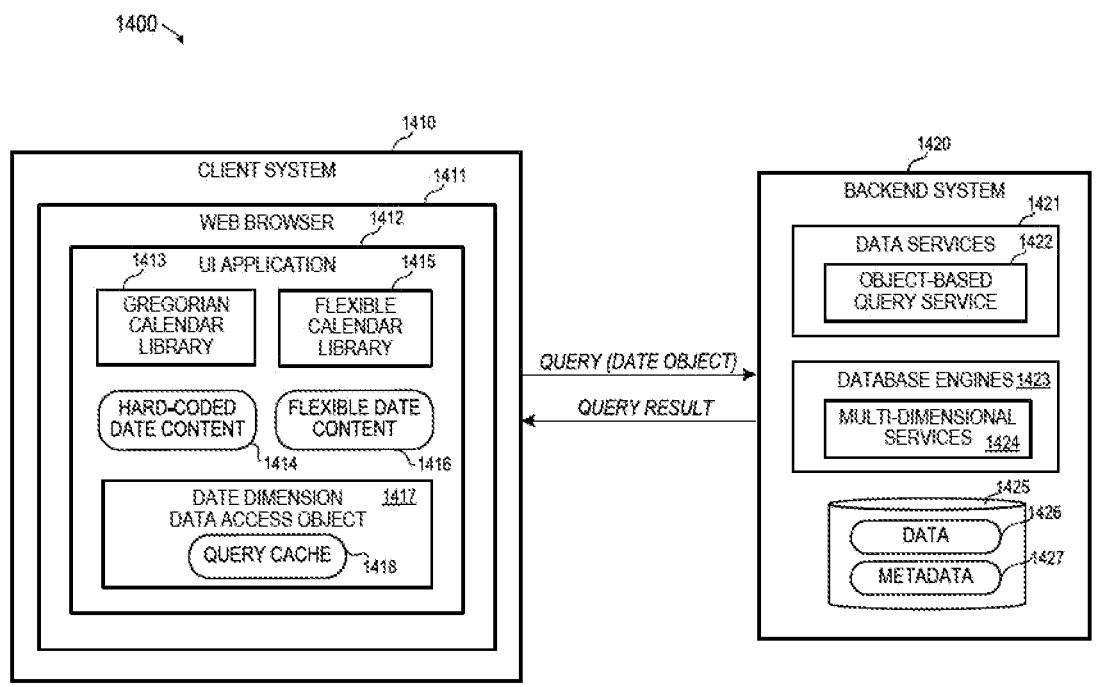
FIG. 14 is a block diagram of a system architecture implementing custom date dimensions according to some embodiments.

FIG. 14 is a block diagram of system 1400 to provide display of tabular data according to some embodiments. System 1400 represents an architecture in which a client application is user interface application 1412 executing within Web browser 1411 of client system 1410. User interface application 1412 may utilize a client-side framework consisting of program code libraries associated with various user interface elements and operations. The framework may be based on Javascript and HTML but embodiments are not limited thereto. This implementation allows user interface rendering to be performed in the Web browser and for the logic of the user interface applications to be implemented in Javascript executed on the client system.

The libraries include Gregorian calendar library 1413 and flexible calendar library 1415. Gregorian calendar library 1413 may provide date operations based on the Gregorian calendar as reflected in hard-coded date content 1414 as is known in the art. Flexible calendar library 1415 may provide the client-side functionality described herein with respect to a customizable date dimension. This functionality may utilize flexible data content 1416, which may include keys and descriptions of object instances representing dimension members of the customizable data dimension.

Date dimension data access object 1417 object-based queries to carry out operations on the canonical dates. Results of prior queries, which may include results of fallback requests, are cached in query cache 1418 to supply results for subsequent execution of previously-executed queries without issuing a request to backend system 1420. Data services 1421 of backend system 1420 include object-based query service 1422 capable of responding to queries received from date dimension data access object 1417. Object-based query service 1422 may provide member navigation above to navigate a customized date dimension hierarchy as described above.

Backend system 1420 also includes database engines 1423 such as a multi-dimensional service 1424. Storage system 1425 stores data 1426 and metadata 1427 as is known in the art.

Figure 15:
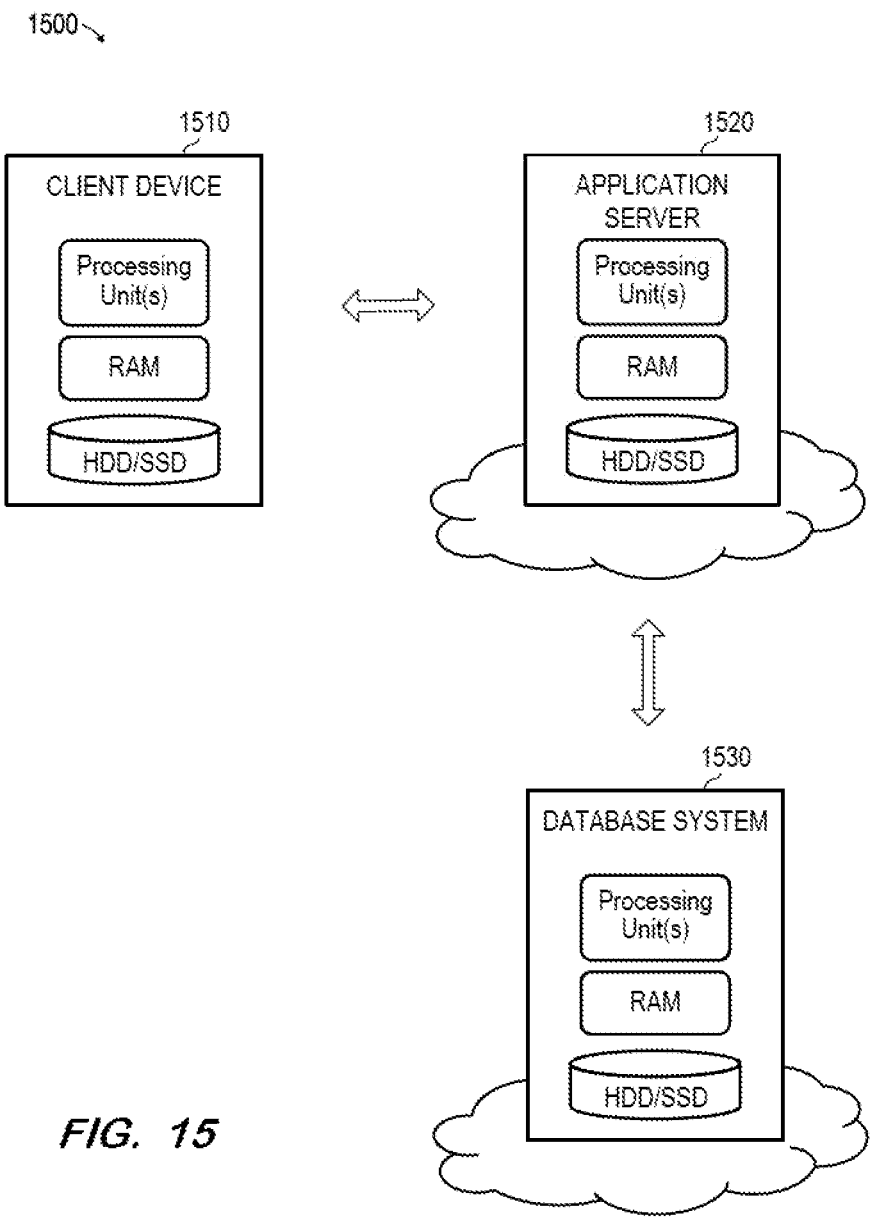
FIG. 15 is a block diagram of cloud-based computing system architecture implementing a system according to some embodiments.

FIG. 15 is a block diagram of cloud-based system 1500 according to some embodiments. In this regard, application server 1520 and database system 1530 may comprise cloud-based compute resources, such as virtual machines, allocated by a public cloud provider providing self-service and immediate provisioning, autoscaling, security, compliance and identity management features.

Application server 1520 may execute program code to support customizable date dimensions. Client device 1510 may execute a client application to communicate with data services executing on application server 1520 to perform date operations as described herein. The client application may transmit a query to the data services, which retrieve a corresponding query result from database system 1530 and return the query result to client device 1510.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code to cause the system to:
receive a first instance of an object, the first instance representing a first date dimension member of a date dimension of a non-Gregorian date dimension hierarchy and comprising a first key value of the first date dimension member, a first user interface representation of the first date dimension member, key values of one or more ancestor date dimension members of the date dimension, and user interface representations of the one or more ancestor date dimension members;
display the first user interface representation of the first date dimension member and the user interface representations of the one or more ancestor date dimension members;
receive a request to increment the first date dimension member at a first hierarchy level of the non-Gregorian date dimension hierarchy;
in response to the request, transmit a query including:
a primary request to navigate the non-Gregorian date dimension hierarchy from the first date dimension member to a first ancestor dimension member at the first hierarchy level, to a next dimension member at the first hierarchy level, and to a descendant dimension member of the next dimension member which corresponds to the first date dimension member; and
a fallback request to navigate the non-Gregorian date dimension hierarchy from the first date dimension member to a parent date dimension member at a second hierarchy level and to a second next dimension member at the second hierarchy level which corresponds to the parent date dimension member;
receive, in response to the query, a second instance of the object representing the descendant dimension member and comprising a second key value of the descendant dimension member, and a second user interface representation of the descendant dimension member; and
display the second user interface representation of the descendant dimension member.

2. A system according to claim 1, the processing unit to execute the processor-executable program code to cause the system to:
receive a second request to cast the first date dimension member to a lower granularity; and
in response to the second request:
request a third instance of the object from a backend system, the request including the first instance and indicating the lower granularity; and
receive the third instance from the backend system, the third instance representing a third date dimension member and comprising a third key value of the third date dimension member, a third user interface representation of the third date dimension member, the first key value of the first date dimension member, the first user interface representation of the first date dimension member, key values of the one or more of the ancestor date dimension members, and user interface representations of the one or more ancestor date dimension members; and
display the third user interface representation, the first user interface representation and the user interface representations of the one or more ancestor date dimension members.

3. A system according to claim 1, the processing unit to execute the processor-executable program code to cause the system to:
- transmit a current date in Gregorian format to a backend system,
- wherein the first instance of the object is received from the backend system in response to transmission of the current date.

4. A system according to claim 2, wherein the first date dimension member represents a week of a year, the first key value comprises a week key, and the key values of the one or more ancestor date dimension members comprise a month key and a year key.

5. A system according to claim 4, the processing unit to execute the processor-executable program code to cause the system to:
- transmit a current date in Gregorian format to a backend system,
- wherein the first instance of the object is received from the backend system in response to transmission of the current date.

6. A computer-implemented method comprising:
- receiving a first instance of an object, the first instance representing a first week dimension member of a non-Gregorian date dimension hierarchy and comprising a first key value of the first week dimension member, a first user interface representation of the first week dimension member, key values of one or more ancestor date dimension members of the date dimension, and user interface representations of the one or more ancestor date dimension members;
- displaying the first user interface representation of the first week dimension member and the user interface representations of the one or more ancestor date dimension members;
- receiving a request to increment the first week dimension member at a first hierarchy level of the non-Gregorian date dimension hierarchy;
- in response to the request, transmitting a query including:
  - a primary request to navigate the non-Gregorian date dimension hierarchy from the first week dimension member to a first ancestor dimension member at the first hierarchy level, to a next dimension member at the first hierarchy level, and to a descendant dimension member of the next dimension member which corresponds to the first week dimension member; and
  - a fallback request to navigate the non-Gregorian date dimension hierarchy from the first week dimension member to a parent date dimension member at a second hierarchy level and to a second next dimension member at the second hierarchy level which corresponds to the parent date dimension member;
- receiving, in response to the query, a second instance of the object representing the descendant dimension member and comprising a second key value of the descendant dimension member, and a second user interface representation of the descendant dimension member; and
- displaying the second user interface representation of the descendant dimension member.

7. A method according to claim 6, further comprising:
- receiving a second request to cast the first week dimension member to a lower granularity; and
- in response to the second request:
  - requesting a third instance of the object from a backend system, the request including the first instance and indicating the lower granularity; and
  - receiving the third instance from the backend system, the third instance representing a third date dimension member and comprising a third key value of the third date dimension member, a third user interface representation of the third date dimension member, the first key value of the first week dimension member, the first user interface representation of the first week dimension member, key values of the one or more of the ancestor date dimension members, and user interface representations of the one or more ancestor date dimension members; and
  - displaying the third user interface representation, the first user interface representation and the user interface representations of the one or more ancestor date dimension members.

8. A method according to claim 6, further comprising:
- transmitting a current date in Gregorian format to the backend system,
- wherein the first instance of the object is received from the backend system in response to transmission of the current date.

9. A method according to claim 7, wherein the first date dimension member represents a week of a year, the first key value comprises a week key, and the key values of the one or more ancestor date dimension members comprise a month key and a year key.

10. A method according to claim 9, further comprising:
- transmitting a current date in Gregorian format to a backend system,
- wherein the first instance of the object is received from the backend system in response to transmission of the current date.

11. A non-transitory computer-readable medium storing program code executable by a processing unit of a computing system which causes the computing system to:
- receive a first instance of an object, the first instance representing a first date dimension member of a date dimension of a non-Gregorian date dimension hierarchy and comprising a first key value of the first date dimension member, a first user interface representation of the first date dimension member, key values of one or more ancestor date dimension members of the date dimension, and user interface representations of the one or more ancestor date dimension members;
- display the first user interface representation of the first date dimension member and the user interface representations of the one or more ancestor date dimension members;
- receive a request to increment the first date dimension member at a first hierarchy level of the non-Gregorian date dimension hierarchy;
- in response to the request, transmit a query including:
  - a primary request to navigate the non-Gregorian date dimension hierarchy from the first date dimension member to a first ancestor dimension member at the first hierarchy level, to a next dimension member at the first hierarchy level, and to a descendant dimension member of the next dimension member which corresponds to the first date dimension member; and
  - a fallback request to navigate the non-Gregorian date dimension hierarchy from the first date dimension member to a parent date dimension member at a second hierarchy level and to a second next dimension member at the second hierarchy level which corresponds to the parent date dimension member;

receive, in response to the query, a second instance of the object representing the descendant dimension member and comprising a second key value of the descendant dimension member, and a second user interface representation of the descendant dimension member; and display the second user interface representation of the descendant dimension member.

12. A medium according to claim 11, the program code executable by a processing unit of a computing system which causes the computing system to:

receive a second request to cast the first date dimension member to a lower granularity; and in response to the second request:
request a third instance of the object from a backend system, the request including the first instance and indicating the lower granularity; and
receive the third instance from the backend system, the third instance representing a third date dimension member and comprising a third key value of the third date dimension member, a third user interface representation of the third date dimension member, the first key value of the first date dimension member, the first user interface representation of the first date dimension member, key values of the one or more of the ancestor date dimension members, and user interface representations of the one or more ancestor date dimension members; and display the third user interface representation, the first user interface representation and the user interface representations of the one or more ancestor date dimension members.

13. A medium according to claim 11, the program code executable by a processing unit of a computing system which causes the computing system to:

transmit a current date in Gregorian format to a backend system, wherein the first instance of the object is received from the backend system in response to transmission of the current date.

14. A medium according to claim 12, wherein the first date dimension member represents a week of a year, the first key value comprises a week key, and the key values of the one or more ancestor date dimension members comprise a month key and a year key.

\* \* \* \* \*